Figure 1:
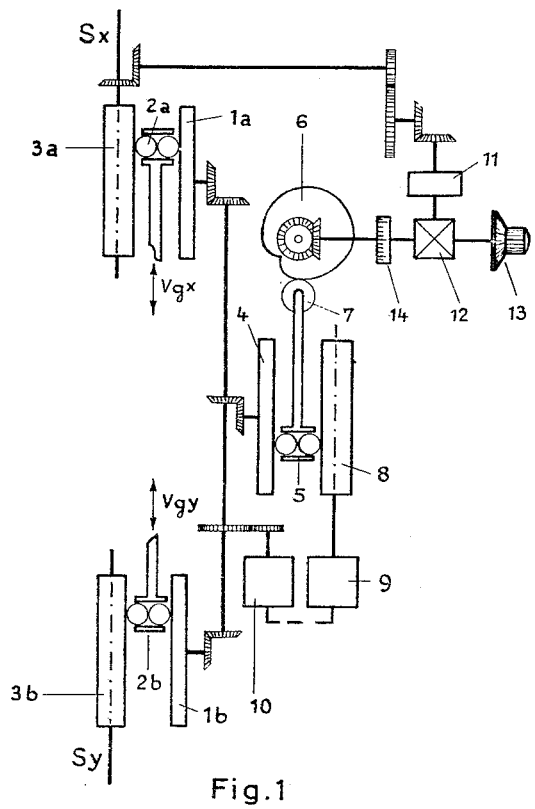

3,049,290
COMPUTING DEVICE FOR CONSIDERING THE
VARIABLE MAP SCALE WHEN INDICATING
THE POSITION OF VEHICLES ON A MAP
Karl Heinrich Ramsayer, 54 Hassenbergstrasse,
Stuttgart, Germany
Filed Apr. 29, 1959, Ser. No. 809,710
Claims priority, application Germany May 12, 1958
4 Claims. (Cl. 235—61)

For the navigation of vehicles, in particular of aircrafts and marine vessels, there have already become known automatic dead reckoning computers aimed at continuously displaying the position of the respective vehicle on a map. This display is insofar entailed by difficulties as the generally employed map with approximately constant scale—e.g. a conform type of conical projection—is only sufficiently correct in scale within a restricted area, so that in the case of a long-distance navigation it appears that there cannot be used one map only, but that a changing of maps has to be taken into account, which requires a circumstantial readjustment of the map display.

It is possible to overcome this difficulty by the use of maps of the Mercator projection type, because on one single Mercator map there may be displayed the whole surface of the earth with the exception of the polar regions, that is, e.g. the surface extending from 75° southern latitude to 75° northern latitude.

However, since the scale of the Mercator map is not a constant one, but is a function of the latitude—in the case of the simplifying assumption of the spherical shape of the earth there will result the relationship $$m = \frac{M_0}{M(\varphi)} = \frac{1}{\cos \varphi}$$

wherein:
$m$=factor of scale
$1:M_0$=scale of the Mercator map at the equator
$1:M(\varphi)$=scale of the Mercator map in the latitude the employment of Mercator maps calls for a special type of computing device, by which this change in scale is considered.

The conventional solutions concerning the automatic consideration of the variable map scale operate with electrical computing elements, which are entailed by a relatively high expenditure.

The object of the present invention relates to a computing device in which this calculation of the scale is carried out with the aid of mechanical computing elements, and in connection with which there is employed an automatic dead reckoning computer which, likewise with the aid of mechanical computing elements, carries out the integration of the ground speed for determining the flight path.

The mode of operation of the invention will be better understood when reference is made to FIG. 1. Of the aforementioned automatic dead reckoning computer there are shown the two integrators which are designed as ball and disc integrators by means of which from the north-south component $v_{gx}$ and from the east-west component $v_{gy}$ of the ground speed there is derived, by way of an integration, the north-south component $s_x$ and the east-west component $s_y$ of the true flight path.

When assuming the number of revolutions $n_s$ of the discs 1a and 1b to be constant, and, when the balls 2a and 2b are displaced in accordance with $v_{gx}$ or $v_{gy}$ respectively, rotations will result on the friction rollers 3a and 3b which are in proportion to the flight path components $s_x$ and $s_y$, as will be seen from the following equations:

In general, the following relation applies to the ball and disc integrator:

$$n_w = K \cdot u \cdot n_s$$

wherein:
$n_w$=number of revolutions of the friction roller per minute,
$n_s$=number of revolutions of the disc per minute,
$u = \frac{a}{R}$ = relative shiftout of the balls,
$a$=shiftout of the balls from the center of the disc,
$R$=radius of the disc,
$K = \frac{R}{r}$ = integrator constant,
$r$=radius of the friction roller.

When considering e.g. the integrator for the north-south component, then $u$ is in proportion to $v_{gx}$, and with respect to the time $t$ there will be obtained the following angle of rotation $\alpha$ of the friction roller 3a:

$$\alpha = \int_0^t n_w \, dt = A \cdot \int_0^t v_{gx} \cdot n_s \cdot dt$$

wherein: $A$=constant. With respect to $n_s = n_0$=const. there will be obtained:

$$\alpha = A \cdot n_0 \cdot \int_0^t v_{gx} \cdot dt = A \cdot n_0 \cdot s_x$$

Accordingly, the angle of rotation $\alpha$ of the friction roller 3a is proportional to the flight path component $s_x$, and by a suitable selection of the gear ratios it is possible to utilize this rotation directly for controlling the display on a map of a constant scale.

Now the idea of the invention consists in that the number of revolutions of the discs $n_s$ is controlled by a computing device in such a way that $n_s$ will become equal to $m \cdot n_0$, so that the rotation of the friction roller 3a will assume the following value:

$$\alpha = A \cdot \int_0^t v_{gx} \cdot n_s \cdot dt = A \cdot n_0 \int_0^t v_{gx} \cdot m \cdot dt = A \cdot n_0 \cdot s_{xm}$$

wherein $s_{xm}$=the flight path component $s_x$ as projected into the Mercator map.

Correspondingly the same applies to the east-west component $s_y$. In this way the rotations of the friction rollers 3a and 3b can be utilized for effecting the control of the display in a Mercator map.

This demand of the speed regulation for the relationship $n_s = m \cdot n_0$ is accomplished in the following way by the computer designed in accordance with the invention:

The disc 4 of a ball and disc integrator used as multiplication computer is driven like the discs 1a and 1b with the number of revolutions $n_s$, while the position of the balls 5 is in such a way controlled by a camplate 6 with the aid of a sensing roller 7 that the relative shiftout will satisfy the function $$u = \frac{1}{m}$$

In accordance with the above mentioned general equation of the ball and disc integrator $n_w = K \cdot u \cdot n_s$ there will be obtained in this particular case and with respect to the number of revolutions of the friction roller 8:

$$n_{w8} = K \cdot \frac{1}{m} \cdot n_s$$

To the friction roller 8 there is coupled a speed-regulating device 9 of the conventional type, adapted to control the driving motor 10 of the automatic dead reckoning computer in such a way that the friction roller 8 will rotate at a constant speed $n_{w8} = K \cdot n_0$. When inserting this value in the above equation there will be obtained the following:

$$n_{w8} = K \cdot n_0 = K \cdot \frac{1}{m} \cdot n_s$$

hence:

$$n_s = m \cdot n_0$$

In this way the given requirement is satisfied.

In view of the fact that the factor of scale $m$ is a function of the latitude and, consequently, also a function of the north-south coordinate number $x_m$ (=distance from the equator in a Mercator map with the scale 1:1 at the equator), the camplate 6, on which the function $1/M$ is stored, must be continuously readjusted in accordance with the coordinate number $x_m$. This is accomplished in that the rotation of the friction roller 3a, via a suitable reduction gear, via the clutch 11, and via the differential gear 12 is used for driving the camplate. By means of the manual control knob 13, the differential gear 12 is used for setting the coordinate number $x_m$ corresponding to the position of the vehicle before the take-off, which may then be read off the graduation 14.

When employing maps with approximately constant scale the clutch 11 is disengaged and the constant factor of scale which is necessary for a certain specified type of map—likewise expressed as coordinate number $x_m$—is set on the graduation 14 by means of the manual control knob 13.

For the calculation of the function $1/m$ which is stored on the camplate 6 there has been used the ellipsoid as an approximation to the shape of the earth, on which is also based the computation of the Mercator map projection. For permitting also an application to the entire surface of the earth with the exception of the polar regions, the camplate is designed in a symmetrical fashion with respectively one half serving the northern hemisphere, and one half serving the southern hemisphere.

The computing device as described hereinbefore bears the advantage that the ball and disc integrator which is used as the computing element is only loaded with the small and always constant torque of the speed-regulating device 9, so that there is ensured an exact multiplication.

The computing operation as described is also capable of being carried out in the case of an interchange of the disc 4 and the friction roller 8 when the shiftout of the balls 5, by a corresponding embodiment of the camplate, is chosen to be in proportion to $m$.

In such a case there will result the following relations:

$$n_{w8} = n_s; \quad u = m; \quad n_{s4} = \frac{1}{K} n_0 = \text{const. (by governor)}$$

consequently:

$$n_{w8} = K \cdot u \cdot n_{s4} = K \cdot m \cdot \frac{1}{K} n_0 = m \cdot n_0 = n_s$$

Just as well it is possible that the described ball and disc integrators for the integration of the X-component respectively the Y-component can be replaced by any type of mechanical friction integrator with a rotating input shaft and a rotating output shaft and a lengthwise movable friction element with which the ratio of speed of the input and output shaft may be changed and the sense of rotation of the output shaft may be reversed, e.g. the balls of the said ball and disc integrators may be replaced by a simple friction wheel. Another possibility is to replace said ball and disc integrators by the Graham variable speed drive.

The third ball and disc integrator may also be replaced by any type of mechanical friction integrator with a rotating input shaft and a rotating output shaft and a lengthwise movable friction element. In this case it is not necessary that the sense of rotation of the output shaft can be reversed by displacing the movable friction element. We can use therefor a conical integrator too, which comprises a conical roller and a cylindrical roller and a friction wheel or two balls or the like.

For the third integrator it is possible to use each of the two rotating shafts as input or output shaft. These two possibilities are already described for a ball and disc integrator as shown in FIG. 1. For a conical integrator it is possible to use the cylindrical roller as input and the conical roller as output or the conical roller as input and the cylindrical roller as output. In the first case said camplate has to represent the reciprocal values and in the second case the direct values of the variable scale factor.

Another possibility for the use of any conformal map projection is to provide means for manually setting the friction element of said third integrator according to the values or reciprocal values of the variable scale factor of the map. Hereby it is not necessary to change the setting of the direct or reciprocal value of the scale factor continuously. It is sufficient to divide the path of the craft in different legs and to set for each leg the mean scale factor within this leg.

While the principles of the invention have been described above in connection with specific embodiments, and particular modifications thereof, it is to be clearly understood that this description is made only by way of example and not as a limitation on the scope of the invention as set forth in the objects thereof and in the accompanying claims.

What is claimed is:

1. In a navigational computer for displaying the position of a craft on a map, the combination which comprises: a conformal map, the scale factor of which depends on the X-coordinate of the X,Y-coordinate system of the map, two mechanical friction integrators each with a rotating input shaft and a rotating output shaft and a lengthwise movable friction element for the integration of the X-component respectively the Y-component of the speed of the craft, means to set the friction elements of said integrators according to said speed components, a third mechanical friction integrator, a motor to drive the rotating input shafts of the three integrators, a camplate representing the reciprocal values of the variable scale factor of the map, means to set said camplate according to the rotations of the output shaft of the X-integrator, means to displace the friction element of the third integrator according to the position of said camplate, a speed regulating device running with constant speed, means to govern the speed of said motor in such a way that the rotating input shafts of the three integrators are driven with such a speed that the speed of the rotating output shaft of the third integrator is in agreement with the constant speed of said speed regulating device.

2. In a navigational computer for displaying the position of a craft on a map, the combination which comprises: a conformal map, two mechanical friction integrators each with a rotating input shaft and a rotating output shaft and a lengthwise movable friction element for the integration of the X-component respectively the Y-component of the speed of the craft, means to set the friction elements of said integrators according to said speed components, a third mechanical friction integrator, a motor to drive the rotating input shafts of the three integrators, means for manually setting the friction element of said third integrator according to the reciprocal values of the variable scale factor of the map, a speed regulating device running with constant speed, means to govern the speed of said motor in such a way that the rotating input shafts of the three integrators are driven with such a speed that the speed of the rotating output shaft of the third integrator is in agreement with the constant speed of said speed regulating device.

3. In a navigational computer for displaying the position of a craft on a map, the combination which comprises: a conformal map, the scale factor of which depends on the X-coordinate of the X,Y-coordinate system of the map, two mechanical friction integrators each with a rotating input shaft and a rotating output shaft and a lengthwise movable friction element for the integration of the X-component respectively the Y-component of the speed of the craft, means to set the friction elements of said integrators according to said speed components, a third mechanical friction integrator, a motor to drive the rotating input shafts of the three integrators, a camplate representing the variable scale factor of the map, means to set said camplate according to the rotations of the output shaft of the X-integrator, means to displace the friction element of the third integrator according to the position of said camplate, a speed regulating device running with constant speed, means to govern the speed of said motor in such a way that the rotating input shafts of the three integrators are driven with such a speed that the speed of the rotating output shaft of the third integrator is in agreement with the constant speed of said speed regulating device.

4. In a navigational computer for displaying the position of a craft on a map, the combination which comprises: a conformal map, two mechanical friction integrators each with a rotating input shaft and a rotating output shaft and a lengthwise movable friction element for the integration of the X-component respectively the Y-component of the speed of the craft, means to set the friction elements of said integrators according to said speed components, a third mechanical friction integrator, a motor to drive the rotating input shafts of the three integrators, means for manually setting the friction element of said third integrator according to the variable scale factor of the map, a speed regulating device running with constant speed, means to govern the speed of said motor in such a way that the rotating input shafts of the three integrators are driven with such a speed that the speed of the rotating output shaft of the third integrator is in agreement with the constant speed of said speed regulating device.

References Cited in the file of this patent
UNITED STATES PATENTS

| | | |
|---|---|---|
| 2,746,677 | Stone | Mar. 22, 1956 |
| 2,796,681 | Ringham et al. | June 25, 1957 |
| 2,936,950 | Parsons | May 17, 1960 |